US011343637B2

(12) United States Patent
 Liusaari (10) Patent No.: US 11,343,637 B2
(45) Date of Patent: May 24, 2022

(54) SYSTEM AND METHOD FOR USE OF CROWDSOURCED MICROPHONE OR OTHER INFORMATION WITH A DIGITAL MEDIA CONTENT ENVIRONMENT

(71) Applicant: SPOTIFY AB, Stockholm (SE)

(72) Inventor: Ari Liusaari, London (GB)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/938,071

(22) Filed: Jul. 24, 2020

(65) Prior Publication Data
US 2021/0185474 A1    Jun. 17, 2021

Related U.S. Application Data

(63) Continuation of application No. 15/856,551, filed on Dec. 28, 2017, now Pat. No. 10,728,695.
(Continued)

(51) Int. Cl.
*H04W 4/021* (2018.01)
*H04S 7/00* (2006.01)
(Continued)

(52) U.S. Cl.
CPC .......... *H04W 4/021* (2013.01); *G06F 3/0484* (2013.01); *H04M 1/6008* (2013.01);
(Continued)

(58) Field of Classification Search
CPC ....... H04W 4/021; H04W 4/02; H04W 4/029; H04W 4/04; H04W 4/08; G06F 17/3087;
(Continued)

(56) References Cited

U.S. PATENT DOCUMENTS 6,022,223 A    2/2000  Taniguchi et al.
6,084,168 A    7/2000  Sitrick
(Continued)

FOREIGN PATENT DOCUMENTS

AU    2013235923 A1 *  7/2014  ............ H04W 4/021
EP    2469882 A2        6/2012
(Continued)

OTHER PUBLICATIONS

Bandsintown Concerts—Apps on Google Play, https://play.google.com/store/apps/details?id=com.bandsintown&hl=en; Jun. 21, 2018, 4 pages.
(Continued)

*Primary Examiner* — Matthew C Sams
(74) *Attorney, Agent, or Firm* — Morgan, Lewis & Bockius LLP (57)    ABSTRACT

In accordance with an embodiment, described herein is a system and method for use of crowdsourced microphone or other information with a digital media content environment. A user may bring their media device with media application to a venue/performance, for example a theater, or a music concert, or other event which the user desires to attend. A microphone and/or other hardware components of the media device can be used to indicate a presence of the media device. The system can also, or alternatively, utilize an interaction information by the media device or the user thereof with other systems or environments. The media application can be configured so that, upon determining that the media device is present within a particular venue or attending a particular performance, the media server can enable one or more venue-aware media application features, to provide various types of functionalities that improve the user experience.

14 Claims, 4 Drawing Sheets

Related U.S. Application Data (60) Provisional application No. 62/440,932, filed on Dec. 30, 2016.

(51) Int. Cl.
    *G06F 3/0484*     (2022.01)
    *H04M 1/60*     (2006.01)
    *H04M 1/72403*     (2021.01)

(52) U.S. Cl.
    CPC ........... *H04M 1/72403* (2021.01); *H04S 7/30* (2013.01); *H04R 2499/11* (2013.01)

(58) Field of Classification Search
    CPC ......... H04L 51/20; H04L 67/10; H04L 67/18; H04N 21/25841; H04N 21/25866; H04N 21/4126; H04N 21/41415; H04N 21/42202; H04N 21/43637; H04N 21/4622; H04N 21/4788; H04N 21/482; H04N 21/8106; H04N 21/812
    See application file for complete search history.

(56) References Cited

U.S. PATENT DOCUMENTS

| | | | | |
|---|---|---|---|---|
| 6,965,785 | B2* | 11/2005 | Mager | H04M 1/72427 455/566 |
| 8,138,930 | B1* | 3/2012 | Heath | G01W 1/00 340/601 |
| 8,929,922 | B2* | 1/2015 | Ginn | H04N 21/482 455/456.3 |
| 9,288,594 | B1 | 3/2016 | Polansky et al. | |
| 9,412,390 | B1 | 8/2016 | Chaudhary | |
| 9,696,884 | B2* | 7/2017 | Lehtiniemi | G11B 19/025 |
| 2002/0193895 | A1 | 12/2002 | Qian et al. | |
| 2003/0017823 | A1* | 1/2003 | Mager | H04M 1/72427 455/414.1 |
| 2008/0113325 | A1 | 5/2008 | Mellqvist et al. | |
| 2009/0094257 | A1 | 4/2009 | Nissen | |
| 2010/0317371 | A1 | 12/2010 | Westerinen et al. | |
| 2011/0144981 | A1 | 6/2011 | Salazar et al. | |
| 2011/0252322 | A1 | 10/2011 | Roberts | |
| 2011/0302504 | A1 | 12/2011 | Khare et al. | |
| 2012/0052838 | A1* | 3/2012 | Ma | H04W 4/029 455/411 |
| 2013/0290842 | A1 | 10/2013 | Rose | |
| 2013/0290843 | A1 | 10/2013 | Lehtiniemi et al. | |
| 2014/0108929 | A1 | 4/2014 | Garmark et al. | |
| 2015/0264533 | A1* | 9/2015 | Geer | G06Q 30/0212 455/456.3 |
| 2015/0278769 | A1* | 10/2015 | Zamer | G06Q 10/1095 705/7.19 |
| 2015/0296288 | A1* | 10/2015 | Anastas | H04R 5/033 381/77 |
| 2016/0192308 | A1* | 6/2016 | Turney | H04W 4/021 370/350 |
| 2017/0127361 | A1* | 5/2017 | Zima | H04W 56/00 |
| 2017/0180438 | A1 | 6/2017 | Persson | |

FOREIGN PATENT DOCUMENTS

| | | | | |
|---|---|---|---|---|
| EP | 2808870 A1 | 12/2014 | | |
| EP | 2927826 A1 | 10/2015 | | |
| EP | 3241357 B1 | 11/2019 | | |
| WO | WO-2014075128 A1 * | 5/2014 | ............. | H04W 4/02 |
| WO | WO2016108087 | 7/2016 | | |
| WO | WO-2016147176 A1 * | 9/2016 | .......... | H04L 61/1511 |

OTHER PUBLICATIONS

Communication of European publication number and information for EP Application No. 15848121.8, published as EP3241357, dated Oct. 11, 2017.
European Patent Office, Communication pursuant to Article 94(3) EPC dated May 24, 2018 for EP Application No. 15848121.8, 4 pgs.
European Patent Office, Decision to Grant, dated Oct. 11, 2019 for EP Application No. 15848121.8, 2 pgs.
International Search Report and the Written Opinion of the International Searching Authority dated Jun. 29, 2017 for PCT/IB2016/001896, 9 pages.
European Patent Office, Communication pursuant to Article 94(3) EPC dated Jan. 30, 2019 for EP Application No. 16840316.0, 5 pages.
Liusaari, Office Action, U.S. Appl. No. 15/856,551, dated Apr. 30, 2018, 7 pgs.
Liusaari, Final Office Action, U.S. Appl. No. 15/856,551, dated Sep. 13, 2018, 10 pgs.
Liusaari, Office Action, U.S. Appl. No. 15/856,551, dated Mar. 27, 2019, 11 pgs.
Liusaari, Notice of Allowance, U.S. Appl. No. 15/856,551, dated Dec. 27, 2019, 9 pgs.
Liusaari, Notice of Allowance, U.S. Appl. No. 15/856,551, dated Mar. 9, 2020, 10 pgs.

* cited by examiner

SYSTEM AND METHOD FOR USE OF CROWDSOURCED MICROPHONE OR OTHER INFORMATION WITH A DIGITAL MEDIA CONTENT ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application is a continuation of U.S. patent application titled "SYSTEM AND METHOD FOR USE OF CROWDSOURCED MICROPHONE OR OTHER INFORMATION WITH A DIGITAL MEDIA CONTENT ENVIRONMENT", application Ser. No. 15/856,551, filed Dec. 28, 2017; which claims the benefit of priority to U.S. Provisional Patent Application titled "SYSTEM AND METHOD FOR USE OF CROWDSOURCED MICROPHONE OR OTHER INFORMATION WITH A DIGITAL MEDIA CONTENT ENVIRONMENT", Application No. 62/440,932, filed Dec. 30, 2016; which application is herein incorporated by reference.

FIELD OF INVENTION

Embodiments of the invention are generally related to providing digital media content, and are particularly related to a system and method for use of crowdsourced microphone or other information with a digital media content environment.

BACKGROUND

Today's consumers enjoy the ability to access a tremendous amount of media content, such as music and videos, using a wide variety of media devices. Digital media content environments, for example media streaming services such as Spotify, enable users to stream music content that complements their lifestyle, while commuting, exercising, relaxing at home, or engaging in other types of activities. Such digital media content environments are well suited to offering additional lifestyle-oriented functionality that can provide an improved user experience. However, traditional digital media technologies are limited in the extent to which they can integrate with the user's physical environment.

SUMMARY

In accordance with an embodiment, described herein is a system and method for use of crowdsourced microphone or other information with a digital media content environment. A user may bring their media device with media application to a venue/performance, for example a theater, or a music concert, or other event which the user desires to attend. A microphone and/or other hardware components of the media device can be used to indicate a presence of the media device. The system can also, or alternatively, utilize an interaction information by the media device or the user thereof with other systems or environments. The media application can be configured so that, upon determining that the media device is present within a particular venue or attending a particular performance, the media server can enable one or more venue-aware media application features, to provide various types of functionalities that improve the user experience.

DETAILED DESCRIPTION

As described above, digital media content environments, for example media streaming services such as Spotify, enable users to stream music content that complements their lifestyle, while commuting, exercising, relaxing at home, or engaging in other types of activities; and are well suited to offering additional lifestyle-oriented functionality that can provide an improved user experience. However, traditional digital media technologies are limited in the extent to which they can integrate with the user's physical environment.

In accordance with an embodiment, described herein is a system and method for use of crowdsourced microphone or other information with a digital media content environment. A user may bring their media device with media application to a venue/performance, for example a theater, or a music concert, or other event which the user desires to attend. A microphone and/or other hardware components of the media device can be used to indicate a presence of the media device. The system can also, or alternatively, utilize an interaction information by the media device or the user thereof with other systems or environments. The media application can be configured so that, upon determining that the media device is present within a particular venue or attending a particular performance, the media server can enable one or more venue-aware media application features, to provide various types of functionalities that improve the user experience.

Digital Media Content Environments

Figure 1:
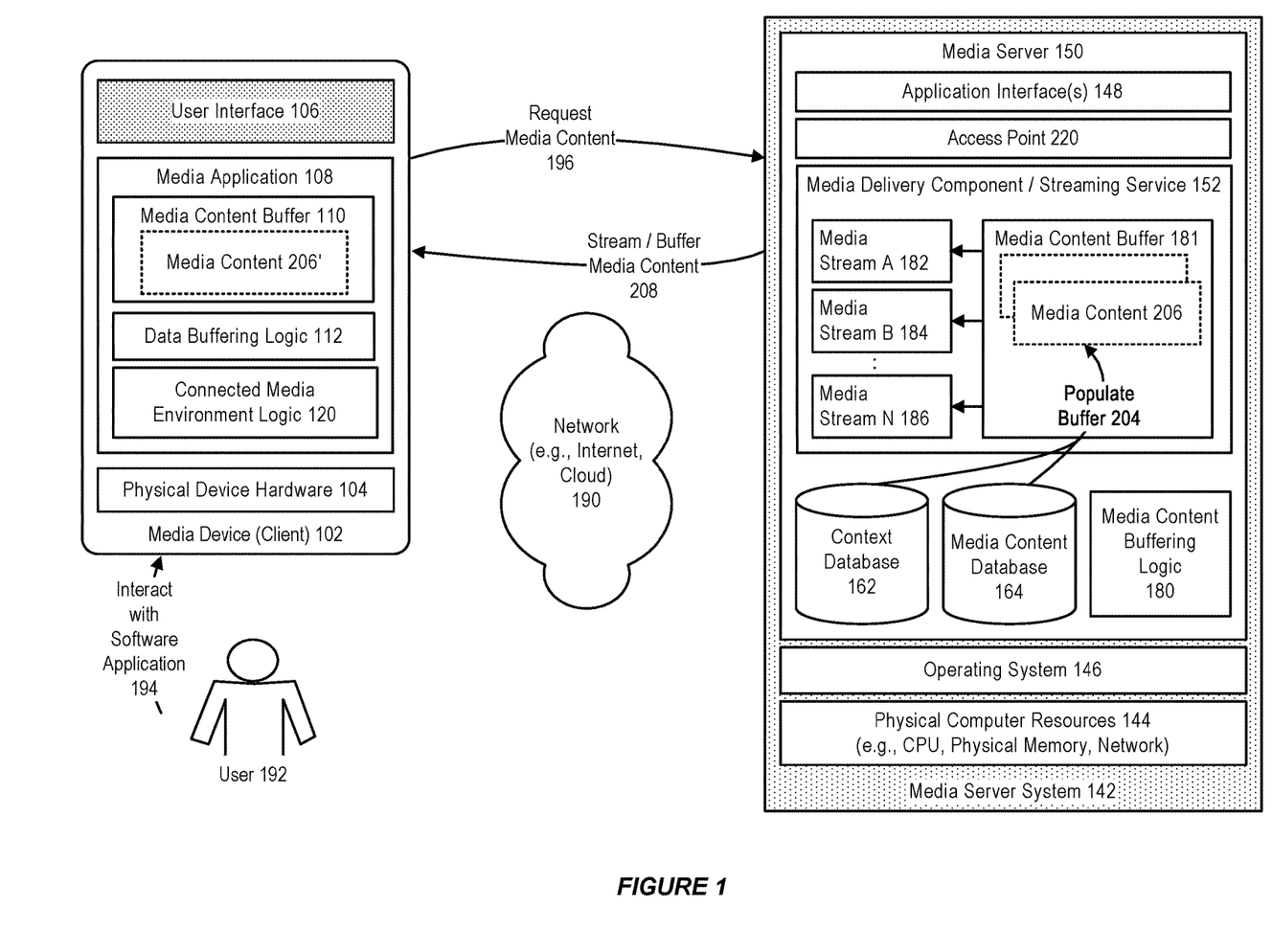
FIG. 1 illustrates an example digital media content environment, in accordance with an embodiment.

FIG. 1 illustrates an example digital media content environment, in accordance with an embodiment.

As illustrated in FIG. 1, in accordance with an embodiment, a media device 102, operating as a client device, can receive and play media content provided by a media server system 142 (media server), or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 120, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system 146 or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, say from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 192 can interact 194 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 196 to the media server, via the server's application interface. The media server can populate its server-side media content buffer at the server 204, with corresponding media content, 206 including one or more streams of media content data, and can then communicate 208 the selected media content to the user's media device, or to a controlled device as appropriate, where it can be buffered in a client-side media content buffer for playing at the device.

In accordance with an embodiment, and as further described below, the system can include a server-side media gateway or access point 220, which can be provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "access-point", which forwards client requests to other servers, such as sending one or more metadataproxy requests to one of several metadataproxy machines, on behalf of the client or end user.

Venue-Aware Media Application Features

In accordance with an embodiment, the system can include the use of crowdsourced microphone or other information with a digital media content environment, so that upon determining that the media device is present within a particular venue or attending a particular performance, the media server can enable one or more venue-aware media application features, to provide various types of functionalities that improve the user experience.

Figure 2:
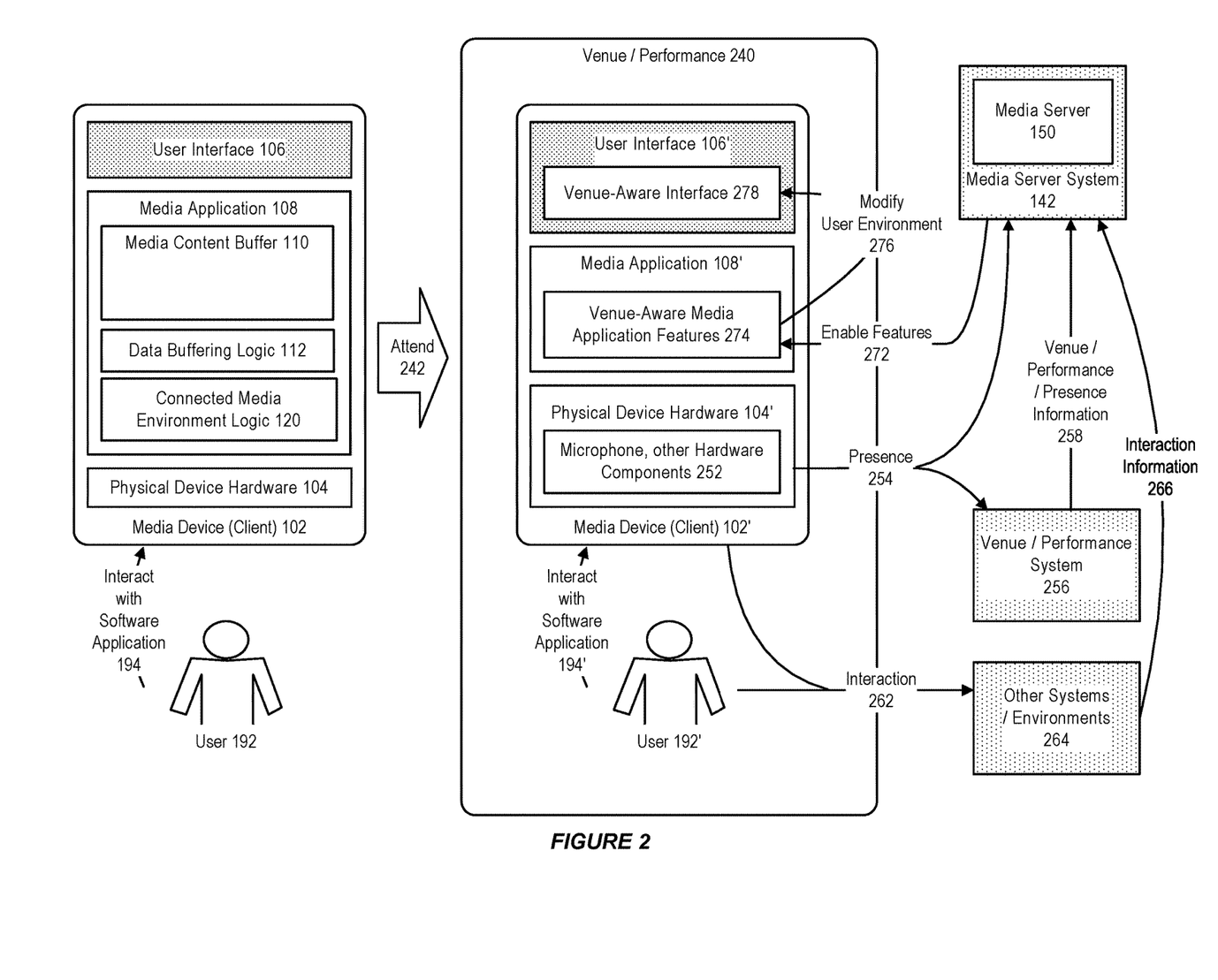
FIG. 2 illustrates use of crowdsourced microphone or other information with a digital media content environment, in accordance with an embodiment.

FIG. 2 illustrates use of crowdsourced microphone or other information with a digital media content environment, in accordance with an embodiment.

As illustrated in FIG. 2, in accordance with an embodiment, a user may bring their media device with media application to a venue/performance 240, for example to a theater, or a music concert, or another type of event which the user desires to attend 242.

In accordance with an embodiment, a microphone and/or other hardware components 252 of the media device can be used to indicate a presence 254 of the media device within the venue or at the performance.

In accordance with various embodiments, the determination of a media device's presence (and user attendance) at a particular venue or at the performance can be achieved in a number of ways, such as for example: matching a GPS location of the media device to a time and location of known performances; hearing, through the device's microphone, a musical performance taking place at the venue; cross-referencing the attendance of nearby (e.g., via Bluetooth, GPS, or ultrasound) user devices which have already registered their attendance; identifying a third-party social media posting referencing a user's attendance, such as a Snapchat or Instagram message/image that includes a metadata containing location coordinates; predicting a user's attendance based on a known ticket purchase by the user; and/or explicitly registering a user's attendance based on a direct interaction from the user.

For example, a media application (e.g., a Spotify app) can be configured to prompt the user with a question "Are you at the (band name) concert?", and present "Yes"/"No" options to enable the user to set their particular attendance state.

In accordance with an embodiment, such presence information can be further determined by a venue/performance system 256 that is associated with a particular venue or performance, and can be provided as a combination of venue/performance/presence information 258 to a media server.

Alternatively, in accordance with an embodiment, the venue/performance/presence information can be communicated directly from the media device to the media server.

In accordance with an embodiment, the system can also, or alternatively, utilize an interaction information 262 by the media device (or by the user thereof) with other systems or environments 264, for example with social messaging environments at which the user has indicated their intent to attend a particular venue or performance.

Such interaction information 266 can then be similarly provided to the media server, either via those other systems or environments, or as described above directly from the media device to the media server.

In accordance with an embodiment, the media application can be configured so that, upon determining that the media device (and the user thereof) is present within a particular venue or attending a particular performance, the media server can enable 272 one or more venue-aware media application features 274.

In accordance with an embodiment, the venue-aware media application features can then be used to modify the user environment 276, for example by modifying the operation or appearance of the user interface to include a venue-aware interface 278, or to provide other types of functionalities that improve the user experience.

For example, a user may desire to attend a concert where a band is performing. Realizing where it is located, the media application (e.g., a Spotify app) on the user's media device (e.g., smartphone) can use device components such as its illuminated device screen, touch input interface, microphone, accelerometer, GPS radio, or other device components and features, to transform the media device into an interactive multimedia extension of the live concert experience, for the individual user and the crowd as a whole, to everyone's surprise and delight.

In accordance with an embodiment, the features and functionality can be created and customized in a way that is specific to, e.g., the band or the particular performance. In crafting such an interactive experience, the designer can draw from a toolbox of enhanced features which have been developed beforehand, and are made available to the designer, some examples of which enhanced features are described in further detail below.

Figure 3:
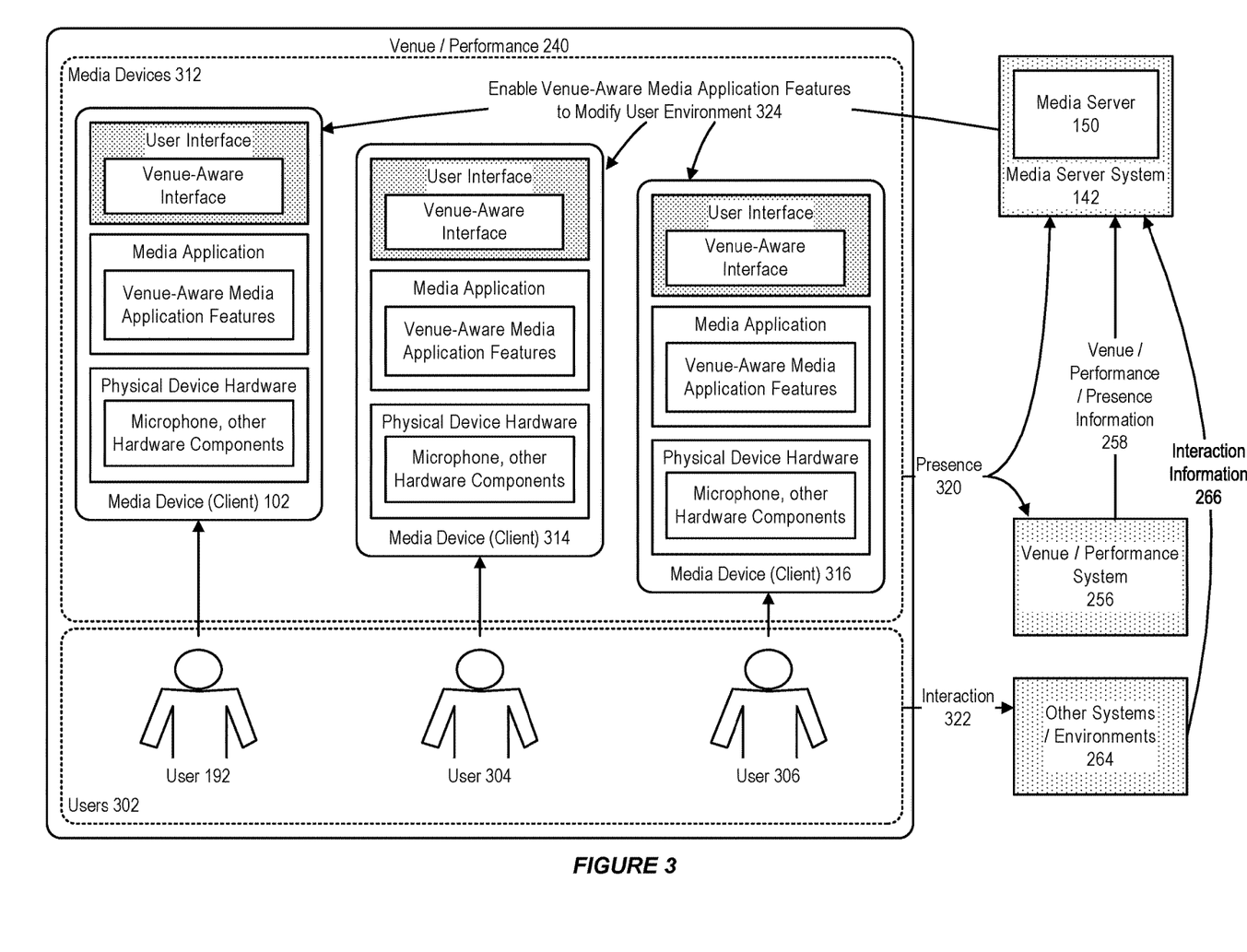
FIG. 3 further illustrates use of crowdsourced microphone or other information with a digital media content environment, in accordance with an embodiment.

FIG. 3 further illustrates use of crowdsourced microphone or other information with a digital media content environment, in accordance with an embodiment.

As illustrated in FIG. 3, in accordance with an embodiment, in some venues or performances a crowd, group, or other plurality of users 302, having a plurality of media devices 312, may be in attendance, for example, at a music concert.

For example, as illustrated in FIG. 3, in addition to the original user and their media device, both user 304 and user 306 also have media devices 314, 316 respectively, each of which are configured to support venue-aware media application features as described above.

In accordance with an embodiment, when the users enter the venue/performance, their media devices can register its presence 320, and/or the system can also utilize interaction information 322 by the device (i.e., user), determine the presence of multiple media devices and users in attendance. The media server can then enable one or more venue-aware media application features on each of the media devices 324, to modify the user environments at those devices.

In accordance with an embodiment, in addition to establishing a user's attendance, the system can continue to use hardware on the mobile device to collect additional data, for example to continue to enhance and maintain the quality of the enhancements to the user experience.

For example, in accordance with an embodiment, the media device microphone can enable synchronization with the music playing. Rather than simply relying on an external metadata about the performance that says, e.g., song A will start at 10:35 PM, a live recorded waveform received via the microphone can be used to enable a precise synchronization if the band happens to begin the next song a few minutes late.

As another example, in accordance with an embodiment, the media device microphone can be used to assist the system to stay in more precise synchronization with the audio the user hears from the stage and speakers. In a large venue, users can perceive the amount of time the sound takes to travel. Instead of timing all of the media devices to a centralized clock, the waveform captured from the device microphone can more precisely control the elements of the enhanced user experience.

As another example, in accordance with an embodiment, the microphone can be used to determine an exact physical location within three-dimensional space in the venue. A strong single noise played from two or three single sources around the perimeter of the venue will reach devices at different locations within the venue at slightly different times. Using triangulation and time-of-flight, the system can determine where within the venue a device is currently being held, and update that location as users move around the venue.

As another example, in accordance with an embodiment, the media device camera allows precise synchronization to the lighting, to create a strobe effect, for example by incorporating both environmental lights and the screens of visiting devices, which is more effective than if such functionality was timed based solely on device clocks and mobile phone network time sources.

In accordance with an embodiment, when the media device (i.e., user) leaves the venue, the enhanced user experience stops, and the media application resumes its usual operation, for example presenting a "goodbye" interaction to the user, asking a final question, presenting a final piece of information, or soliciting a last third-party social media posting from the user.

Figure 4:
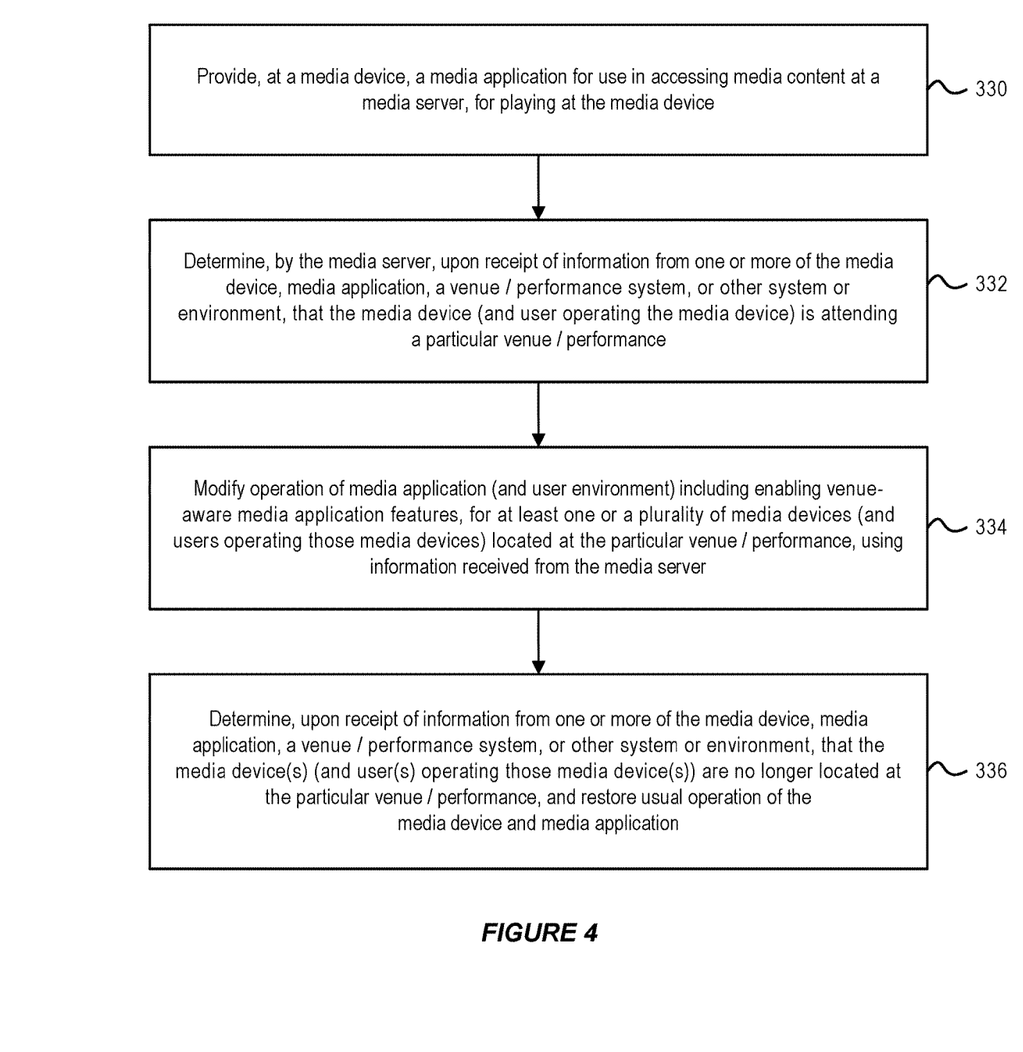
FIG. 4 illustrates a flowchart of a method for use of crowdsourced microphone or other information with a digital media content environment, in accordance with an embodiment.

FIG. 4 illustrates a flowchart of a method for use of crowdsourced microphone or other information with a digital media content environment, in accordance with an embodiment.

As illustrated in FIG. 4, in accordance with an embodiment, at step 330, a media application is provided at a media device, for use in accessing media content at a media server, for playing at the media device.

At step 332, the media server determines, upon receipt of information from one or more of the media device, media application, a venue/performance system, or other system or environment, that the media device (and user operating the media device) is attending a particular venue or performance.

At step 334, the operation of the media application (and user environment) is modified, including enabling venue-aware media application features, for at least one or a plurality of media devices (and users operating those media devices) located at the particular venue/performance, using information received from the media server.

At step 336, a determination is made, upon receipt of information from one or more of the media device, media application, a venue/performance system, or other system or environment, that the media device(s) (and user(s) operating those media device(s)) are no longer located at the particular venue/performance, and the usual operation of the media device and media application is restored.

Enhanced Features and Applications

As described above, in accordance with an embodiment, a designer of an interactive user experience can draw from a toolbox of enhanced features developed beforehand, and made available to the designer, some examples of which are illustrated below:

Lighting: in accordance with an embodiment, venue lighting may be attached to a programmed system to show patterns and effects to complement the music while the concert happens. The techniques described herein enable the illuminated screens of mobile devices in attendance to the landscape of light-producing devices at the event designer's disposal.

Audio playback: in accordance with an embodiment, the speakers on the media device can produce audio to complement the speakers installed at the venue. Some instruments, tracks, or effects might play from user devices instead of installed speakers.

Audio recording: in accordance with an embodiment, mastering a track of the live performance, the band's audio engineers can incorporate audio recorded from the audience not only from microphones installed throughout the venue, but also from the microphones attached to attendee's devices.

Singing and lyrics: in accordance with an embodiment, the media device screen can show lyrics that appear in time while the song plays in the venue. Users singing along can have their audio incorporated into the larger experience.

Touch: in accordance with an embodiment, the device touch display could suddenly produce audio for the user as part of the experience, either on the device, surrounding devices, or venue speakers, giving the user a musical instrument, like a drum, to tap on. Alternatively, input from the device touch panel could control light in the venue or a surrounding vicinity display.

Attendance: in accordance with an embodiment, display screens in the venue can list statistics about visitors, such as the number of attendees who are participating in the enhanced experience. Venue screens can display notable attendees, while screens of other attendees display large arrows, pointing them in the direction of the nearest super-fan. Precise location positioning and six-axis orientation data from the accelerometer allows the arrows to keep pointing in the same direction as users move their devices.

Social media posts: in accordance with an embodiment, when identified at the venue and part of the experience, the user can be given additional capabilities to make special social media postings, including functionality, like a Snapchat or Snapchat-like photography filter, also only available to the user while he or she is at the concert.

Data mining: in accordance with an embodiment, after the event has concluded, organizers can access a list of who was in attendance complete with their user identity, and third-party social media identities.

The above examples of enhanced features are provided by way of example, to illustrate some of the types of features which the system can support. In accordance with various embodiments, additional and/or different enhanced features and applications can be supported.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for use of crowdsourced microphone or other information with a digital media content environment, comprising:
a media device including a media application, and a microphone or other hardware components of the media device that can be used to indicate a presence of the media device to a media server, wherein the media device:
displays a user interface of the media application associated with a media-providing service, the user interface of the media application providing a first set of features;
determines a location of the media device;
provides the location of the media device to a media server;
receives, from the media server, an indication enabling one or more venue-aware media application features that are enabled upon determining that the location of the media device is at a particular venue associated with an event;
in response to the indication, updates display of the media application to include the one or more venue-aware media application features, wherein the one or more venue-aware media application features include the use of a camera of the media device to synchronize display of a strobe-lighting effect that is synchronized with lighting of the venue detected by the camera; and
in accordance with the location of the media device no longer being at the particular venue, updates the user interface of the media application to provide the first set of features and to remove the one or more venue-aware media application features.

2. The system of claim 1, wherein the location of the media device is determined by one or more venue or performance systems that are associated with a particular venue or performance, and is provided as a combination of one or more venue, performance, or presence information, to a media server.

3. The system of claim 2, wherein the one or more venue, performance, or presence information is communicated directly from the media device to the media server.

4. The system of claim 1, wherein the venue-aware media application features can be used to modify the operation or appearance of the user interface to include a venue-aware interface.

5. The system of claim 1, wherein the one or more venue-aware media application features include the use of audio data detected from the microphone to synchronize with audio generated at the venue.

6. The system of claim 1, wherein determining that the location of the media device is at the particular venue associated with the event is performed by one or more of:
receiving, by the microphone of the media device, audio corresponding to the event associated with the particular venue;
matching a location data associated with the media device, with additional data indicative of a time and location of known events;
determining a presence of other media devices that are registered as being in attendance at the event;
receiving, from another system, a data indicative of a user attendance at the event; and
receiving, by the media device, an interaction with the media application indicative of the user attendance at the event.

7. A method for use of crowdsourced microphone or other information with a digital media content environment, comprising:
at a media device having a microphone or other hardware components of the media device that can be used to indicate a presence of the media device to a media server, the media device including a media application:

displaying a user interface of the media application associated with a media-providing service, the user interface of the media application providing a first set of features;

determining a location of the media device;

providing the location of the media device to a media server;

receiving, from the media server, an indication enabling one or more venue-aware media application features that are enabled upon determining that the location of the media device is at a particular venue associated with an event;

in response to the indication, updating display of the media application to include the one or more venue-aware media application features, wherein the one or more venue-aware media application features include the use of a camera of the media device to synchronize display of a strobe-lighting effect that is synchronized with lighting of the venue detected by the camera; and in accordance with the location of the media device no longer being at the particular venue, updating the user interface of the media application to provide the first set of features and to remove the one or more venue-aware media application features.

8. The method of claim 7, wherein the location of the media device is determined by one or more venue or performance systems that are associated with a particular venue or performance, and is provided as a combination of one or more venue, performance, or presence information, to a media server.

9. The method of claim 8, wherein the one or more venue, performance, or presence information is communicated directly from the media device to the media server.

10. The method of claim 7, wherein the venue-aware media application features can be used to modify the operation or appearance of the user interface to include a venue-aware interface.

11. A non-transitory computer readable storage medium, including instructions stored thereon for execution by a media device having a microphone or other hardware components of the media device that can be used to indicate a presence of the media device to a media server, the media device including a media application, wherein the instructions include instructions for:

displaying a user interface of the media application associated with a media-providing service, the user interface of the media application providing a first set of features;

determining a location of the media device;

providing the location of the media device to a media server;

receiving, from the media server, an indication enabling one or more venue-aware media application features that are enabled upon determining that the location of the media device is at a particular venue associated with an event;

in response to the indication, updating display of the media application to include the one or more venue-aware media application features, wherein the one or more venue-aware media application features include the use of a camera of the media device to synchronize display of a strobe-lighting effect that is synchronized with lighting of the venue detected by the camera; and in accordance with the location of the media device no longer being at the particular venue, updating the user interface of the media application to provide the first set of features and to remove the one or more venue-aware media application features.

12. The non-transitory computer readable storage medium of claim 11, wherein the location of the media device is determined by one or more venue or performance systems that are associated with a particular venue or performance, and is provided as a combination of one or more venue, performance, or presence information, to a media server.

13. The non-transitory computer readable storage medium of claim 12, wherein the one or more venue, performance, or presence information is communicated directly from the media device to the media server.

14. The non-transitory computer readable storage medium of claim 11, wherein the venue-aware media application features can be used to modify the operation or appearance of the user interface to include a venue-aware interface.

* * * * *